Figure 1:
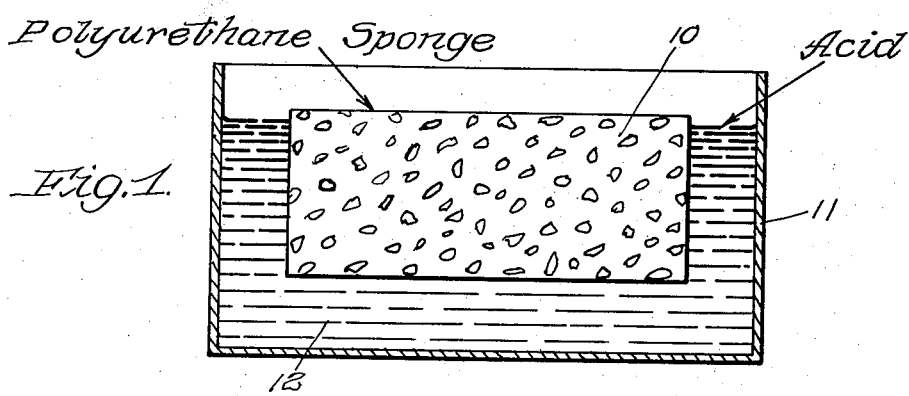
Figure 2:
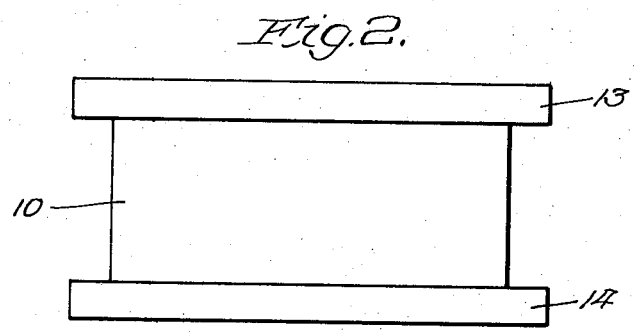
Figure 3:
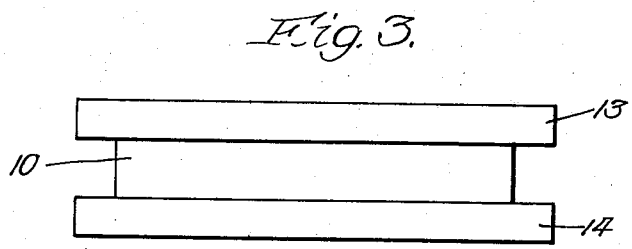
Figure 4:
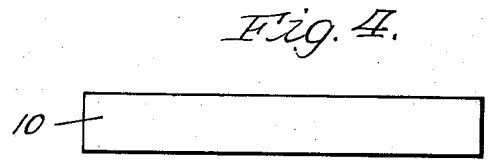

Sept. 10, 1963

MING C. CHEN ETAL 3,103,408

METHOD OF MAKING POLYURETHANE PRODUCTS
AND POLYURETHANE PRODUCTS

Filed Dec. 23, 1960

Inventors:
Ming C. Chen,
Marvin E. Cox,
By Holgren, Brady, Wegner,
Allen & Stellman, Attys.

United States Patent Office 3,103,408
Patented Sept. 10, 1963

3,103,408
METHOD OF MAKING POLYURETHANE PRODUCTS AND POLYURETHANE PRODUCTS
Ming C. Chen, Park Forest, and Marvin E. Cox, Oak Lawn, Ill., assignors to Simoniz Company, a corporation of Delaware
Filed Dec. 23, 1960, Ser. No. 77,787
6 Claims. (Cl. 18—48)

This invention relates to methods of making polyurethane products and to the products.

Foamed polyether polyurethane products made by reacting a polyisocyanate with a polyol and a foaming agent have cells of regular geometric configuration in cross section. The geometric cell formation includes membranes on the plane sides of the cells and a realtively heavy, skeletal structure at the angles formed by the intersections of these membrane sides. If some of the membranes are broken or discontinuous the foam has an interconnecting cell structure. However, where they are continuous the foam structure will be closed.

The present invention is concerned with the methods of making polyurethane products and the resulting products in which the polyether polyurethanes are treated with an acid, while being compressed, and the acid removed so as to retain the compressed configuration or state. This treatment permanently compresses the polyurethane sponge and produces a porous sheet that is usable for cleaning and wiping surfaces such as automobile bodies, as a filter medium because of its porosity, as a wash cloth or dish cloth and as an applicator for finishes such as polishing waxes. Depending upon the type and strength of acid used, as well as the time and temperature of treatment, the resulting compressed product can either have all cells of the original polyurethane sponge compressed so as to produce a sheet containing only micropores or the resulting product can be at the other extreme, being reduced only slightly in thickness while retainings approximately the original cellular state.

One of the features of this invention therefore is to provide a method of making a polyurethane product in compressed, relatively high density form by compressing a mass of polyether polyurethane sponge to a thickness less than that of the sponge in uncompressed state while subjecting the compressed sponge to an acid for a time sufficient to retain at least part of its compressed condition followed by removing the acid from the thusly treated sponge.

Another feature of the invention is to provide a polyurethane product prepared by this method.

Other features and advantages will be apparent from the following description of the invention.

The acids that may be used may be organic or inorganic but are preferably mineral acids as the compressed product can be prepared more readily, in less time, and/or at less cost with the mineral acids. The acids that may be used include hydrochloric, sulfuric, nitric, phosphoric, acetic, trichloracetic, trifluoroacetic and the like.

When hydrochloric acid is used an excellent compressed product is produced. If a relatively high concentration of the acid is used, such as 36%, the final compressed product is a collapsed material with substantially none of the original porous texture remaining but containing only micropores.

By controlling the kind of acid, the acid strength, the treating time and the temperature of treatment, the extent of collapse can be controlled as desired.

In the method of practicing the invention the polyurethane sponge is compressed at any desired pressure to reduce the thickness of the sponge to that desired. Thus in making a cloth like product, a polyurethane sponge about ¾ of an inch thick was compressed to ¼ of an inch thick. In general the amount of pressure used will vary depending upon the stiffness of the polyurethane sponge. The sponge is compressed and immersed in the acid solution which is preferably aqueous for the length of time desired. In general the concentration of acid in the aqueous solution will vary between 15–85% by weight of the solution, the time of immersion will vary between just sufficient to wet the compressed sponge throughout up to approximately 30 minutes or more, and the temperature will ordinarily vary between room temperature up to the boiling point of the solution.

The manner in which the polyether polyurethane sponge is prepared forms no part of the present invention and the methods of making such urethane sponges are well known and widely described in patents as well as other scientific literature.

As an organic compound containing, as the sole reacting groups, a plurality of isocyanate groups there may be used, in the preparation of the polyurethane product, any of the poly-NCX compounds, X being oxygen or sulfur, i.e., any polyisocyanate, any polyisothiocyanate, or any isocyanateisothiocyanate. The polyisocyanates, because of their greater reactivity are preferred to the polyisothiocyanates. The preferred compounds are those having two groups of the formula —NCX and, of these, the arylene diisocyanates and the arylene diisothiocyanates are, in general, more useful in the practice of the present invention and form a preferred class because of their ease of preparation, low cost, reactivity, etc. Examples of this class are: 2,4-toluene diisocyanate, 2,6-toluene diisocyanate, m-phenylene diisocyanate, 4-chloro-1,3-phenylene diisocyanate, 1-chlorophenylene 2,4-toluene diisocyanate, and naphthalene 1,5-diisocyanate.

The polyglycols that may be used to produce the polyurethanes by reacting with the poly NCX compounds should be of high molecular weight with the preferred molecular weight being from about 750 to 12,000 and the especially preferred being from about 1,000 to 4,000. The polyglycols include the Pluronics, Carbowaxes of a molecular weight of about 1,000 to 6,000 and polypropylene glycols of a molecular weight of about 1,000 to 4,000.

The Pluronics are linear compounds in which water-soluble polyoxyethylene groups are at both ends of a polyoxypropylene chain. The preferred Pluronics are those of a molecular weight of at least about 1,000 up to a molecular weight of about 12,000 and containing up to about 95% and preferably between 2–70% polyoxyethylene groups in the molecule.

The Carbowaxes are described, for example, in Chemical and Engineering News, vol. 23, February 10, 1945, pages 247–251, in an article by C. P. McClelland and R. L. Bateman, "Technology of the Polyethylene Glycols and Carbowax Compounds."

Among the suitable polyglycols are also polyethylene glycols with molecular weights ranging from about 1,000 to 6,000 as Carbowax 1000, Carbowax 1540, Carbowax 4000 and Carbowax 6000 (the numbers indicate the molecular weights) and polyethylene glycol E4000 and E6000 (the letters E are for ethylene and the numbers indicate the molecular weights); polypropylene glycols having molecular weights ranging from about 1,000 to 4,000 such as Polypropylene Glycol 1025, 2025 and 2725 (the numbers indicate the molecular weights) and polypropylene glycol P2000, P3000 and P4000 (the letters P are for propylene and the numbers indicate the molecular weights); and mixed polyglycols with molecular weights of about 1,000 to 4,000 such as the Pluronics, these being surface active agents obtained by condensing ethylene oxide on a polyoxypropylene base.

One general method of making the urethane foam (the words foam and sponge are used interchangeably herein) is by reacting a polyisocyanate with a polyether containing an active hydrogen group to produce a prepolymer. The prepolymer is then foamed by reaction with water and preferably an amine catalyst to produce carbon dioxide which forms bubbles and results in the foams. The urethane foam may also be produced by the so-called one-shot process wherein the poly NCX compound, the polyether and the foamer such as water and, preferably, a catalyst and a silicone fluid are all included in the reaction at the same time. These reactions are well known to those skilled in the art and have been the subject of much study by many researchers and research groups in this country since 1945.

The following methods of producing polyurethanes are exemplary only of the many methods available as disclosed in the technical literature including patents:

EXAMPLE 1

A prepolymer resin was prepared by the following procedure: 444.8 lbs. of Pluronic L–61, hydroxyl number 50.5, was premixed with 63.5 lbs. of PPG–400, hydroxyl number 288.8, representing a hydroxyl equivalent ratio of 0.4448 to 0.3635. This polyol mixture should have a hydroxyl number of 80–81 and the acid number was adjusted to .03, and water content to 0.39%. To this mixture 235 lbs. of toluene diisocyanate, .002 to .003% total acidity, were added while mixing. The NCO/OH ratio was about 3.44 to 1.0. After 30 minutes the heat of reaction caused the temperature to rise to about 130° F. With additional heating requiring 2 hours, the mixture reached a temperature of 212° F. The reaction was allowed to proceed at 212° F. until the viscosity was about 3900–4200 centistokes. The resulting prepolymer was cooled to 100–25° F.; it contained about 9.35% free NCO. The total process took about 8½ to 9½ hours.

For each 100 parts by weight of the above prepolymer, previously adjusted to 9.8% free NCO, the following were added: 0.2 parts of silicone fluid DC–200 (polydimethylsiloxane) at 25° C., 50 centistokes viscosity, 17 parts Tritanox RCHT–X and .167 part Benzedine Yellow No. 12220 dye.

A catalyst solution was made as follows: 15 parts water, 1.5 parts triethyl amine and 5 parts diethylethanol amine.

The sponge material was prepared by foaming as follows:

Precision metering pumps were used to pump out the prepolymer resin/catalyst solution in the ratio of 32–35:1 to a mixing head having a capacity of 100 ml. Six triple blade turbine mixers were employed using a mixing speed of 3400 r.p.m. To facilitate the resin pumping, the resin was heated up to 120° F. The rate of pumping was 5 lbs. per minute (ca.). The mixed material was delivered to a box-shaped mold through a ⅜″ opening where foaming took place immediately. After approximately 10 minutes, the foam's rise discontinued. After 30 minutes, it was removed from the mold and crushed by running between closely spaced squeeze rollers to break any closed cell walls, then post-cured at 185–190° F. for 16 hours. All said parts are by weight.

The Pluronic L–61 has the formula $$HO(C_2H_4O)_a(C_3H_6O)_b(C_2H_4O)_cH$$

It has a molecular weight of the polyoxypropylene base of about 1501–1800 and an oxyethylene content of about 10%. The PPG–400 is polypropyleneglycol with a molecular weight of about 400. The Titanox RCHT–X consists of calcium sulfate particles coated with titanium dioxide.

EXAMPLE 2

Component A

Into a closed container equipped with an agitator and means for maintaining a nitrogen sweep are charged 105 parts by weight of "Hylene TM," an 80:20 isomeric mixture of toluene-2,4-diisocyanate and toluene-2,6-diisocyanate, the temperature being adjusted to 35° C. and then 800 parts by weight of "Teracol–30" (1,4-polybutylene ether glycol) are added, the latter being at a temperature of about 40° C. This mixture is agitated for 20 hours at a temperature of 30–40° C. under nitrogen sweep. 100 parts additional toluene-2,4-diisocyanate-toluene-2,6-diisocyanate was then added and the temperature is raised to 140° C. for two hours. This reaction mass is then cooled to 50° C. and 61 parts by weight of additional toluene-2,4-diisocyanate-toluene-2,6-diisocyanate mixture are added and the material mixed for two hours. The resulting material is then cooled to 25° C.

Component B

In a separate vessel are blended at room temperature 246 parts by weight of water, 108 parts by weight of n-methyl morpholine and 31 parts by weight of "Emulphor EL–719," a nonionic polyoxyethylated vegetable oil dispersing agent.

3.62 parts by weight of Component B are thoroughly mixed with 100 parts by weight of Component A for about 25 seconds and at an initial temperature of about 25° C. and immediately thereafter the mixture is poured into a container of sufficient volume to permit expansion. The temperature rises to 70° C. After about 30 minutes, the container together with the foamed mass is heated in an oven at 70° C. for about 16 hours. The foamed mass is then removed from the container and cut into blocks.

The resulting open-celled foam has a density of 0.05 gram per cubic centimeter, a tensile strength of 2.2 kilograms per square centimeter and a dry softness of 8 mm.

EXAMPLE 3

| | Grams |
|---|---|
| TP 4040 polyol resin | 100 |
| L–520 (silicone fluid) | 0.7 |
| Stannous octoate | 0.3 |
| Triethylene diamine | 0.15 |
| N-ethylmorpholine | 0.5 |
| Water | 3.5 |
| Hylene TM | 43.0 |

The ethylmorpholine, the stannous octoate and the silicone fluid were mixed with the TP 4040 polyol resin at room temperature until a uniform mixture was achieved. The triethylene diamine was then mixed with the water at room temperature until dissolved and the solution was added to the above mixture with additional mixing for about 5 minutes to produce a uniform mixture. The Hylene TM was then mixed at room temperature into the above mixture and when the mixture began to bubble was poured into a mold. The mixture foamed up in the mold and after reaching a maximum volume was then cured in an oven at 100° C. for one-half hour.

The TP 4040 polyol is

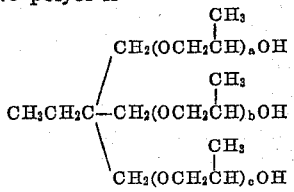

having a molecular weight of about 4100 and with $a$, $b$ and $c$ being approximately equal.

The L-520 is a copolymer of dimethyl polysiloxane and a polyoxyalkylene fluid, containing 25% by weight of the siloxane and 75% by weight of a linear copolymer containing equal parts by weight of polyoxethylene and polyoxypropylene stopped by butoxy groups and having a molecular weight of about 1500 and a viscosity at 25° C. of 900 centistokes.

EXAMPLE 4

Step 1

| | |
|---|---:|
| Polypropylene glycol (molecular weight 2000) | 100 |
| Water (total) | 0.15 |
| Hylene TM: | |
|   (—NCO/OH ratio) | 1.05/1 |
|   (NCO/H₂O ratio) | 1.0/1.0 |
| Reaction conditions—Step 1: | |
|   Time, minutes | 120 |
|   Temperature, ° F | 248 |

Step 2

| | |
|---|---:|
| Hylene TM to 9.5% total —NCO | About 25 |
| Reaction conditions—Step 2: | |
|   Time, minutes | 60 |
|   Temperature, ° F | 248 |

Prepolymer Properties

| | |
|---|---:|
| Brookfield viscosity at 86° F. cps | 6,500 |
| Percent NCO | 9.5 |

The amount of Hylene TM used in Step 1 depends on the hydroxyl number of the glycol. The amount added in Step 2 depends on the —NCO content of the polymer from Step 1 and the final —NCO content desired for the foaming reaction.

The method of preparing the polymer of Example 2 is as follows:

(1) The entire process should be carried out under nitrogen with continuous agitation.

(2) Charge the polypropylene glycol and water, calculated to give a total of 0.15 part with the water present in the glycol.

(3) Blend water and glycol for 30 minutes at 95–140° F.

(4) Charge the Hylene TM and blend for 30 minutes, allowing a free exothermic reaction—temperature rise will be 9–14° F.

(5) Raise the temperature of the charge to 248° F. at a rate of 3° F. per minute.

(6) Hold at 248° F.±3° F. for 2 hours.

(7) Make the second addition of Hylene TM after 2 hours at 248° F. Assume an —NCO content of .2% and adjust to 9.5% —NCO.

(8) Continue reaction at 248° F. for one hour.

(9) Force cool the charge to 104° F. at 5° C. per minute.

The foam was produced by mixing the following in the stated portions and permitting the mixture to foam to its maximum volume:

| | Parts by weight |
|---|---:|
| The above prepolymer (9.5% —NCO) | 100 |
| Silicone oil—50 ctks | 0.5 |
| N-methyl morpholine | 1.0 |
| Triethyl amine | 0.3 |
| Water at 110% theory | 2.25 |

After setting for a time as indicated in the preceding examples, the foam was ready to be cut into sections of any desired size.

EXAMPLE 5

Step 1

| | |
|---|---:|
| Polypropylene glycol (molecular weight 2000) | 100 |
| Water (total) | 0.15 |
| Hylene TM: | |
|   (—NCO/OH ratio) | 1.05/1 |
|   (NCO/H₂O ratio) | 1.0/1.0 |
| Reaction conditions—Step 1: | |
|   Time, minutes | 120 |
|   Temperature, ° F | 176 |

Step 2

| | |
|---|---:|
| Hylene TM to 9.5% total —NCO | About 25 |
| Reaction conditions—Step 2: | |
|   Time, minutes | 120 |
|   Temperature, ° F | 284 |

Prepolymer Properties

| | |
|---|---:|
| Brookfield viscosity at 86° F. cps | 17,000 |
| Percent NCO | 9.5 |

The amount of Hylene TM used in Step 1 depends on the hydroxyl number of the glycol. The amount added in Step 2 depends on the —NCO content of the polymer from Step 1 and the final —NCO content desired for the foaming reaction.

The method of making the polymer of Example 3 is as follows:

(1) The entire process should be carried out under nitrogen with continuous agitation.

(2) Charge polypropylene glycol and water, calculated to give a total of 0.15 part with the water present in the glycol.

(3) Charge the Hylene TM (ratio: NCO/OH—1.05/1.0 and NCO/H₂O—1.0/1.0 for water present in the glycol). Blend for 30 minutes, allowing a free exothermic reaction. The temperature rise will be 7–9° F.

(4) At the completion of the exotherm-blending period, raise the temperature of the charge to 176° F. at a rate of 3° F. per minute.

(5) Hold at 176° F.±3° F. for two hours.

(6) After holding for two hours at 176° F., raise the temperature of the charge to 284° F. at a rate of 3° F. per minute. Hold at 284° F. for two hours.

(7) Make the second addition of Hylene TM after two hours at 284° F. Assume —NCO content of .3% and adjust to 9.5% —NCO.

(8) Force cool the charge to 104° F. immediately after making the second addition of Hylene TM.

The foam was produced by mixing the following in the stated portions and permitting the mixture to foam to its maximum volume:

| | Parts by weight |
|---|---:|
| The above prepolymer (9.5% —NCO) | 100 |
| Silicone oil, 50 ctks | 0.5 |
| N-methyl morpholine | 1.0 |
| Triethyl amine | 0.3 |
| Water at 110% theory | 2.25 |

After setting for a time as indicated in the preceding examples the foam was ready to be cut into sections of any desired size.

The above methods are only exemplary of the preparation of the polyether polyurethane sponges. Any of these polyether polyurethane sponges whether prepared by these methods or any other methods may be used to make the products of this invention by treatment with acid in the manner specified. As an example a series of tests were made with the polyurethane sponge of Example 1 treated with various acids at various concentrations, times and temperatures. The following table gives the results achieved with the last column of the table giving the condition of the final product after the acid had been removed and the pressure released. In each example the original sponge was ¾ of an inch thick and was compressed down to a thickness of about ¼ inch after being treated with acid. It was then rinsed with water to remove the acid.

| Reagent | Concentration in H$_2$O, percent | Time | Temp., °C | Final Product Condition |
|---|---|---|---|---|
| HCl | 36 | wet thru | 25 | substantially completely compressed. |
| HCl | 30 | do | 25 | Do. |
| HCl | 25 | 2 min | 25 | remains compressed. |
| HCl | 20 | 2 min | 25 | Do. |
| H$_2$SO$_4$ | 45 | 2 min | 25 | substantially completely compressed. |
| H$_2$SO$_4$ | 35 | 2 min | 25 | Do. |
| H$_2$SO$_4$ | 30 | wet thru | 25 | very slight compression. |
| H$_2$SO$_4$ | 30 | 30 min | 25 | moderate compression. |
| HNO$_3$ | 40 | wet thru | 25 | remains compressed. |
| HNO$_3$ | 30 | 2 min | 25 | moderately compressed. |
| HNO$_3$ | 30 | 2 min | 60 | remains compressed. |
| H$_3$PO$_4$ | 85 | wet thru | 25 | slight compression, becomes more compressed on rinsing. |
| H$_3$PO$_4$ | 65 | 2 min | 110 | remains compressed. |
| CCl$_3$COOH | 45 | wet thru | 25 | moderately compressed. |
| CCl$_3$COOH | 35 | do | 25 | moderate to slight compression. |
| CCl$_3$COOH | 25 | do | 25 | very slight compression. |
| CCl$_3$COOH | 25 | 25 min | 25 | moderate compression. |
| CCl$_3$COOH | 25 | wet thru | 95 | remains compressed. |
| CF$_3$COOH | dilute | 2 min | 25 | moderate to slight compression. |

The drawings illustrate the practice of the invention as set out in the above table. Thus, in each instance the sponge 10 of Example 1 was immersed in the acid solution 12 held in a container 11 until the sponge was saturated. The sponge 10 was then removed from the acid bath 12 and excess acid solution removed from the sponge as by squeezing. The acid soaked sponge 10 was then placed between the platens 13 and 14 of a press and compressed as above described. The compressed sponge while held between the platens 13 and 14 was washed with water to remove the acid solution after which the sponge maintained its compressed condition.

Having described our invention as related to the embodiments set out herein, it is our intention that the invention be not limited by any of the details of description, unless otherwise specified, but rather be construed broadly within its spirit and scope as set out in the accompanying claims.

We claim:

1. The method of making a permanently compressed polyurethane product, comprising: compressing with a compressive force a foamed cellular polyether polyurethane plastic produced by a process which comprises reacting an organic polyisocyanate with an organic polyether compound having an active hydrogen group that is reactive with an —NCO group, said compressing serving to reduce said foamed plastic to a thickness less than that of said plastic in the uncompressed state; simultaneously subjecting the compressed plastic to an acid for a time sufficient to cause the plastic to retain at least part of its compressed condition; and thereupon removing first excess acid and then said compressive force from the thusly treated plastic.

2. The method of claim 1 wherein said force is approximately 1–15 pounds per square inch.

3. The method of claim 1 wherein said acid is in the form of an aqueous solution containing about 15–70% of acid by weight of said solution.

4. The method of claim 1 wherein said time is between that required to wet substantially completely said plastic up to about 30 minutes.

5. The method of making a permanently compressed polyurethane product, comprising: compressing with a compressive force of about 1–15 pounds per square inch a foamed cellular polyether polyurethane plastic produced by a process which comprises reacting an organic polyisocyanate with an organic polyether compound containing an active hydrogen group that is reactive with an —NCO group, said compressing serving to reduce said foamed plastic to a thickness less than that of said plastic in the uncompressed state; simultaneously subjecting said plastic to an aqueous solution containing about 15–70% of acid by weight of said solution for a time varying between that required to wet substantially completely said plastic up to about 30 minutes; and thereupon removing first excess acid and then said compressive force from the thusly treated plastic.

6. A permanently compressed polyurethane product produced by the method of claim 5.

References Cited in the file of this patent

UNITED STATES PATENTS 2,384,387    Meyer _____ Sept. 4, 1945

FOREIGN PATENTS 1,176,044    France _____ Nov. 17, 1958